UNITED STATES PATENT OFFICE.

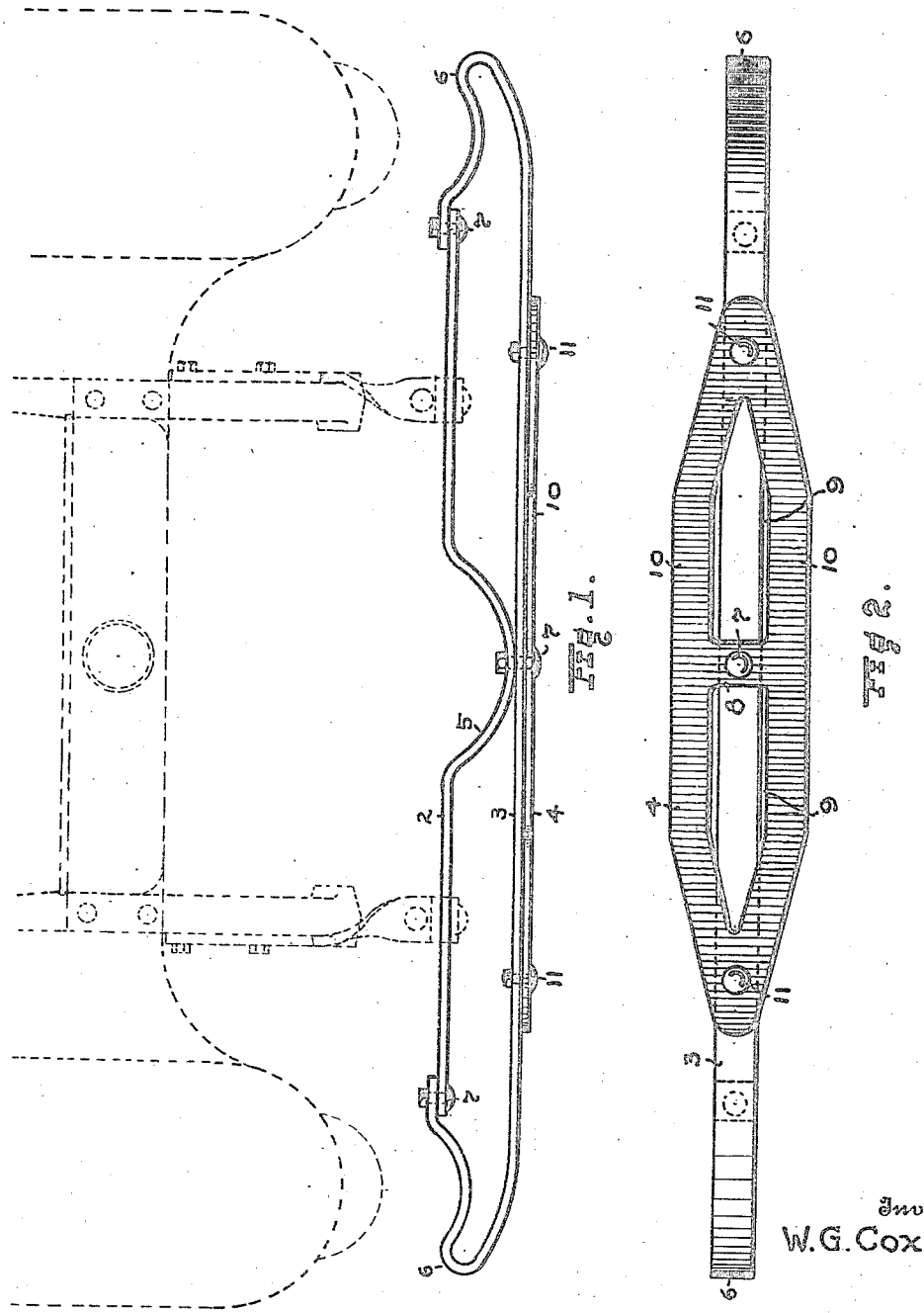

WILLIAM G. COX, OF CLEVELAND, OHIO, ASSIGNOR TO COX BRASS MANUFACTURING COMPANY, OF ALBANY, NEW YORK, A CORPORATION OF NEW YORK.

AUTOMOBILE-BUMPER.

1,397,315.     Specification of Letters Patent.     Patented Nov. 15, 1921.

Application filed September 6, 1921. Serial No. 498,663.

*To all whom it may concern:*

Be it known that I, WILLIAM G. COX, a citizen of the United States, residing at Cleveland, in the county of Cuyahoga and State of Ohio, have invented certain new and useful Improvements in an Automobile-Bumper, of which the following is a specification.

This invention consists of a bumper or buffer adapted to be conveniently attached to either end of any automobile in general use. It is constructed of separate pieces of spring steel formed and united together in a particular way so as to provide a strong and durable spring assembly adapted to flex within limits to absorb and relieve heavy shocks and blows and avoid damage to the bumper and vehicle, and one of the pieces is in the form of a flat plate secured upon the front face of a straight bumper bar so as to provide a relatively wider impact area at the middle of the bumper than at its ends. I am aware that it is not broadly new to use a separate face-plate at the middle of a spring bumper to provide a wider impact area at that point than at the ends, and therefore disclaim such a construction in view of the disclosures in the prior French patent of M. Skrzydlewski, No. 457,970, dated July 25, 1913. However, the construction and organization of parts as hereinafter shown and described and more particularly pointed out in the claims provides an exceptionally simple and effective form of bumper which in its specific form is new and novel in so far as I am aware and can be manufactured and supplied to the public at a comparatively lower cost than the bumper shown in said French patent.

Now, referring to the drawing accompanying this application, Figure 1 is a plan or top view of my improved bumper in full lines, the end portion of an automobile being shown in dotted lines. Fig. 2 is a front or face view of the bumper. As shown, the bumper comprises three pieces of spring metal, to wit, a rear bar 2, a front bar 3, and a face-plate 4, respectively. Rear bar 2 is a straight narrow piece of metal excepting midway thereof where it is bent abruptly into arcuate shape of relatively short radius to provide a small protruding bow portion 5 adapted to engage and reinforce the middle straight portion of front bar 3 which has its opposite ends 6 curved rearwardly and extending inwardly toward each other for a short distance into overlapping relation with the flat extremities of the long straight ends of rear bar 2. Three bolts or rivets 7 are used to secure bars 2 and 3 together where engaged at their middle and at their respective overlapping ends, and the middle bolt also passes through a bolt opening in the integral web or connecting portion 8 of the slotted or open face-plate 4 so as to unite said plate at its center to the straight flat middle portion of front bar 3. The slots or openings 9—9 in the face-plate at each side of integral web 8 decreases the weight of the face-plate but the strength of the plate is not materially impaired by the absence of such stock inasmuch as the middle connecting web or portion 8 of the plate is integral with the upper and lower impact sections 10—10, that is to say that sections 10—10 are adapted to receive impacts without breaking or bending because of the integral connection 8 which crosses and is backed up by the straight middle portion of front bar 3. Web 8 being integral with the plate, it also follows that the connection between the upper and lower impact sections 10—10 cannot become separated or loose as might occur with a separate tie member such as disclosed in the French patent hereinbefore referred to. The outlines and proportions of the plate are subject to considerable variation but the ends of the plate are preferably narrowed or reduced in width to approximately the width of front bar 3 and fastened by bolts or rivets 11—11 to said bar 3, or these ends could be electrically welded or brazed to the bar or fastened together in any other known mechanical way. The union of the rear and front bars and the face-plate at their middle makes the bumper exceptionally strong at this central point, and the short bow portion 5 permits an effective bracing union of this kind to be made without materially impairing the resiliency and cushioning qualities of the bumper, and such a union also prevents independent vibratory movements and rattle of the bars where spaced apart. A short bow portion in rear bar 2 also affords relatively long straight spring ends adapted to be engaged and held adjustably in brackets secured to the frame of the vehicle and whereby the bumper may be mounted on frames of different widths on brackets spaced apart different distances.

Face-plate 4 may be of any suitable thickness and in practice it is stamped or cut from a single piece of sheet-steel.

What I claim, is:—

1. A spring bumper or buffer for an automobile, comprising a straight front bar having its opposite ends curved rearwardly and extending inwardly toward each other, and a rear bar having straight ends affixed to the extremities of said front bar and formed with an abrupt arcuate portion of relatively small radius protruding forwardly at its middle adapted to engage the back side of said front bar midway between its ends.

2. A spring bumper or buffer for an automobile, comprising separate front and rear bars spaced apart and connected together at their corresponding ends, and an open face-plate of greater width than said front bar having an integral connecting web at its center bearing against said front bar.

3. A spring bumper or buffer for an automobile, comprising a rear bar and a front bar united together at their corresponding ends but spaced apart between said ends and the rear bar having an arched portion at its middle engaging said front bar at its middle, an open face-plate of greater width than said front bar having an integral web at its middle bearing against said front bar, and means uniting said plate and front bar together.

4. A spring bumper or buffer for an automobile, comprising a rear bar having straight ends and an abrupt arcuate protruding portion at its middle, a straight front bar having curved ends bent rearwardly and inwardly toward each other in overlapping engagement with the ends of said rear bar, a slotted face-plate having a middle web bearing against said front bar, means uniting the ends of said bars together, and means adapted to secure the arcuate portion of the rear bar and the web of said face-plate upon opposite sides of said front bar.

In testimony whereof I affix my signature.

WILLIAM G. COX.